United States Patent
Morphet

(10) Patent No.: US 8,488,063 B2
(45) Date of Patent: Jul. 16, 2013

(54) METHOD AND APPARATUS FOR CONTROLLING OVERSHOOT IN A VIDEO ENHANCEMENT SYSTEM

(75) Inventor: Stephen Morphet, Hemel Hempstead (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 1924 days.

(21) Appl. No.: 11/361,705

(22) Filed: Feb. 24, 2006

(65) Prior Publication Data

US 2006/0192897 A1    Aug. 31, 2006

(30) Foreign Application Priority Data

Feb. 25, 2005 (GB) .................... 0503969.8

(51) Int. Cl.
*H04N 5/21* (2006.01)

(52) U.S. Cl.
USPC ....................................... 348/625

(58) Field of Classification Search
USPC ....................................... 348/625
See application file for complete search history.

(56) References Cited

U.S. PATENT DOCUMENTS

| 4,198,650 A | * | 4/1980 | Hongu et al. ............ 348/613 |
| 4,758,891 A | | 7/1988 | Hitchcock et al. |
| 4,994,915 A | | 2/1991 | Takahashi et al. |
| 5,369,446 A | * | 11/1994 | Parker et al. ............ 348/625 |
| 5,666,443 A | | 9/1997 | Kumashiro |
| 6,278,494 B1 | | 8/2001 | Kanai et al. |
| 6,363,526 B1 | | 3/2002 | Vlahos et al. |
| 2003/0107678 A1 | | 6/2003 | Lin et al. |

FOREIGN PATENT DOCUMENTS

EP    1 113 390 A2    7/2001

OTHER PUBLICATIONS

International Search Report mailed Oct. 11, 2006 (3 pages).

\* cited by examiner

*Primary Examiner* — Antoinette Spinks
(74) *Attorney, Agent, or Firm* — Flynn, Thiel, Boutell & Tanis, P.C.

(57) ABSTRACT

A method for enhancing an edge transition in a video signal comprising the steps of receiving a video signal including an edge transition, generating a correction signal for the edge transition, applying the correction signal to the video signal to produce a corrected signal and restricting the amplitude of the corrected signal to extend between extended maximum and minimum amplitude limits in dependence on the measured maximum and minimum amplitudes of a predefined pattern of pixels adjacent to the edge transition.

2 Claims, 9 Drawing Sheets

Original Edge

Soft Edge

Second Derivative of Soft Edge

Enhanced Edge
(Soft edge minus 2nd derivative)

Small Enhancement

Optimal Enhancement
(in a system without clamping)

Over-enhancement without clamping

Over-enhancement with clamping

5x5 Pixel Cross    5x5 Pixel Box

METHOD AND APPARATUS FOR CONTROLLING OVERSHOOT IN A VIDEO ENHANCEMENT SYSTEM

FIELD OF THE INVENTION

The present invention relates to a method and apparatus for enhancing a video image and, in particular, to a method and apparatus for controlling overshoot in a video enhancement system.

BACKGROUND OF THE INVENTION

In video image processing it is a common requirement to improve the sharpness of an image, or to enhance the definition of edges. Many video processing techniques can cause the loss of high frequency information from the images causing a softening or blurring effect. The use of a suitable enhancement process can replace the missing information and increase the apparent quality of an image.

There are numerous enhancement techniques in use, with a variety of names. Terms such as "edge enhancement" and "sharpening" describe processes that, while they may vary in details, perform essentially similar functions.

U.S. Pat. No. 4,758,891 (Hitchcock et al., Philips Corp.) and U.S. Pat. No. 4,994,915 (Takahashi et al., Hitachi Ltd.) both demonstrate the use of delays to create a "correction signal" which is combined with the original image to produce an enhanced output. Circuits similar to these where the second derivative of the input signal, or an approximation to it, is used to generate the correction signal, form the basis of many image enhancement systems currently in use. The use of a 2nd derivative correction signal is illustrated in FIGS. 1A-1D.

FIG. 1A shows a signal representing a step change in image brightness. This is typical of a section through an edge in the image. In FIG. 1B, previous processing has damaged the signal so that the transition is no longer abrupt, but changes gradually from one brightness level to another. The gradual change in brightness causes the edge to appear blurred rather than sharp. FIG. 1C shows a correction signal generated from the second derivative of the soft edge. FIG. 1D shows the soft edge, after the correction signal has been subtracted. It can be seen that the signal transition from dark to light has been accelerated.

FIGS. 2A-2D show the effect of a gain control that adjusts the amount of correction that is used. It can be seen that increasing the amount of correction increases the speed of transition (seen as a steeper gradient close to the centre of the edge), with FIG. 2C showing the onset of overshoot caused by excessive gain.

Overshoot caused by over-enhancement is generally something to be avoided, as it can give rise to unpleasant 'halo' effects around edges. However, the increased transition speed that comes with such levels of enhancement is desirable.

Clamping is commonly used to restrict the swing of the enhanced signal, permitting higher gains to be used while eliminating overshoot. FIG. 2D shows the effect of clamping, where the signal of FIG. 2C has been clamped to the minimum and maximum values of the input signal. One possible implementation of clamping is to measure the minimum and maximum values of the original signal in the local area, and limit the enhanced signal to that range. This is illustrated in FIG. 4, where the shaded area represents the clamping limits measured using a five pixel wide moving window.

U.S. Pat. No. 6,363,526 (Vlahos, Berman, Dadourian, Ultimatte Corp.) and U.S. Pat. No. 6,278,494 (Inamura, Kanai, Masuda, Canon KK.) describe systems that limit the range of the enhanced signal so as to avoid overshoot.

It is known that a small, carefully controlled amount of overshoot can add significantly to the apparent sharpness of an image, but is not perceived as a visible halo. U.S. Pat. No. 6,363,526 discloses the idea of adding an offset to the measured maximum value of the input signal, and subtracting an offset from the measured minimum, in order to preserve small spikes in the enhanced output.

A further reason to avoid overshoot is that video standards give guidelines on the maximum and minimum values of the video signal. For example, in a YCbCr system such as ITU-R BT601, the luminance channel (Y) may be represented using 8 bit values between 0 and 255. A value of 16 represents black, and a value of 235 represents white. Signal excursions below 16 and above 235, while not strictly prohibited, are discouraged, and values below zero or greater than 255 are, obviously, not representable.

From the discussion of the prior art, it is clear why overshoot control is required. However, a system that eliminates overshoot by clamping to a local minimum and maximum may not provide the flexibility of control that is required.

A sharpening algorithm can have undesirable side effects, such as increasing noise, or adding "graininess" to the image, and those side effects tend to increase with gain. Overshoot can increase the perception of sharpness in an image. Allowing a small amount of overshoot may therefore allow gain to be reduced while retaining the same amount of apparent sharpness, or to allow the apparent sharpness to be increased with no additional gain.

Where the goal is "edge enhancement", rather than "sharpening", variations on the methods described in the prior art may be used to add strong correction to particular types of image feature, e.g., high contrast edges. In these situations some viewers may even prefer the visual effect of halos caused by a large amount of overshoot.

It is therefore apparent that a flexible overshoot control mechanism should allow overshoot to be eliminated altogether, or for controlled quantities of overshoot, ranging from a little to a lot, to be used depending upon the application.

In a system that allows overshoot, care must be taken to ensure that it does not adversely affect image quality in areas where it is not required. For example, a large amount of overshoot may be desirable on large edge transitions, but the same amount of overshoot may be inappropriate in areas of small detail, where it may exaggerate texture or noise. In other cases, an overshoot applied in an area of highlight or deep shadow may cause the signal to saturate, losing detail in the image.

While permitting overshoot, it is also necessary to observe signal excursion restrictions, such as the 16-235 value range in ITU-R BT601 YCbCr encoding.

Embodiments of the present invention permit an amount of overshoot proportional to the size of the feature being enhanced (ie the step in amplitude at the edge). Thus, the amount of overshoot is reduced towards zero as the feature size is reduced to avoid the emphasis of noise. In preferred embodiments the constant of proportionality, which is applied to the size of the feature to determine the permitted amount of overshoot, can be adjusted. Such embodiments enable the amount of overshoot to be controlled to be appropriate for the feature being enhanced.

Further embodiments of the present invention compress the permitted amount of overshoot depending on the limit of the channel (i.e. permitted signal range) and the position of the original signal with respect to those limits. For example, for mid-range signals, the normal amount of overshoot is permitted and for signals closer to the limits of the channel, e.g. almost black or almost white, the amount of overshoot is reduced towards zero. In further embodiments, the compression is used to limit the signal excursion according to the encoding standard (e.g. within the range 16-235). Such embodiments prevent the saturation of the signal.

The invention is defined in its various aspects with more precision in the appended claims to which reference should now be made.

BRIEF DESCRIPTION OF THE DRAWINGS

An embodiment of the invention is now described in detail with reference to the accompanying figures in which.

DETAILED DESCRIPTION

In the following description, the invention is described in the context of a digital video processing system, where signals are represented as a series of discrete pixels, each with a numerical intensity value.

Figure 1A:
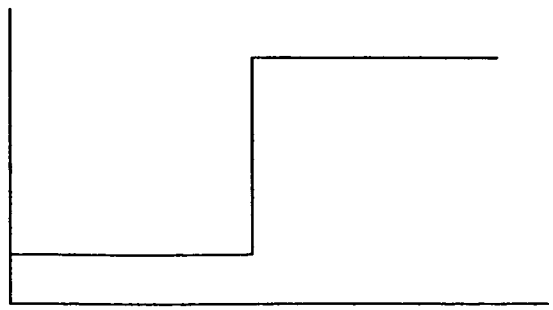
FIGS. 1A-1D show the effects of edge enhancement using a second derivative.
Figure 1B:
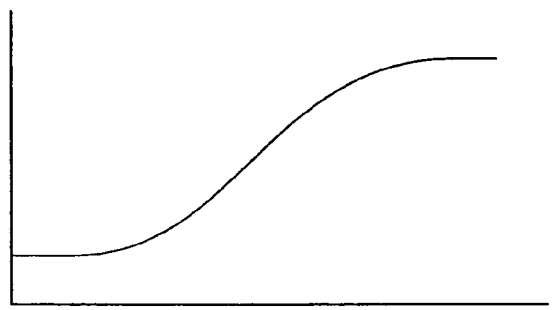
Figure 1C:
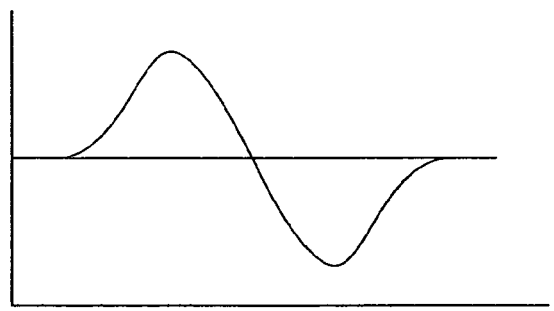
Figure 1D:
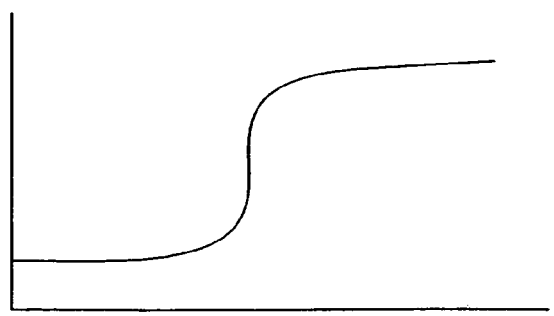
Figure 2A:
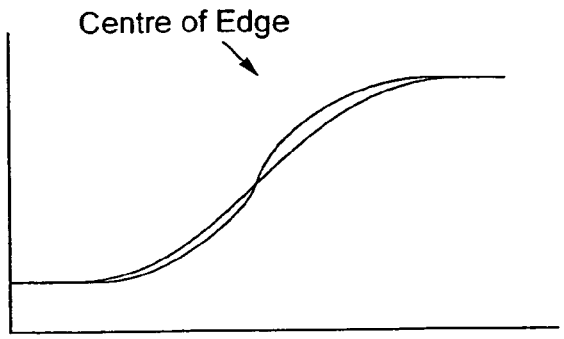
FIGS. 2A-2D show the effects of varying levels of enhancement.
Figure 2B:
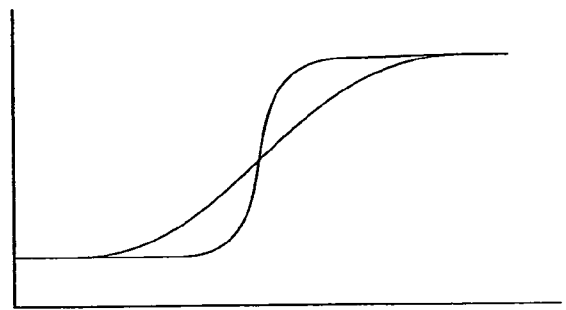
Figure 2C:
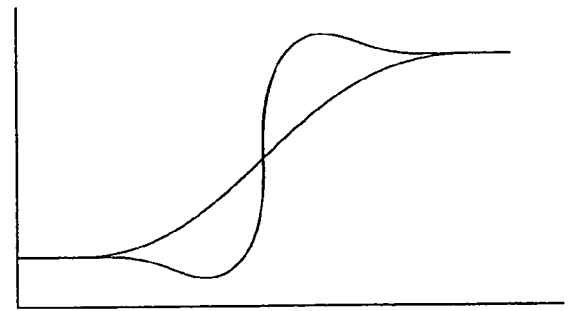
Figure 2D:
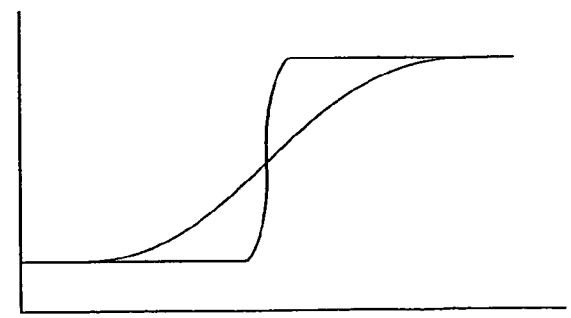
Figure 3:
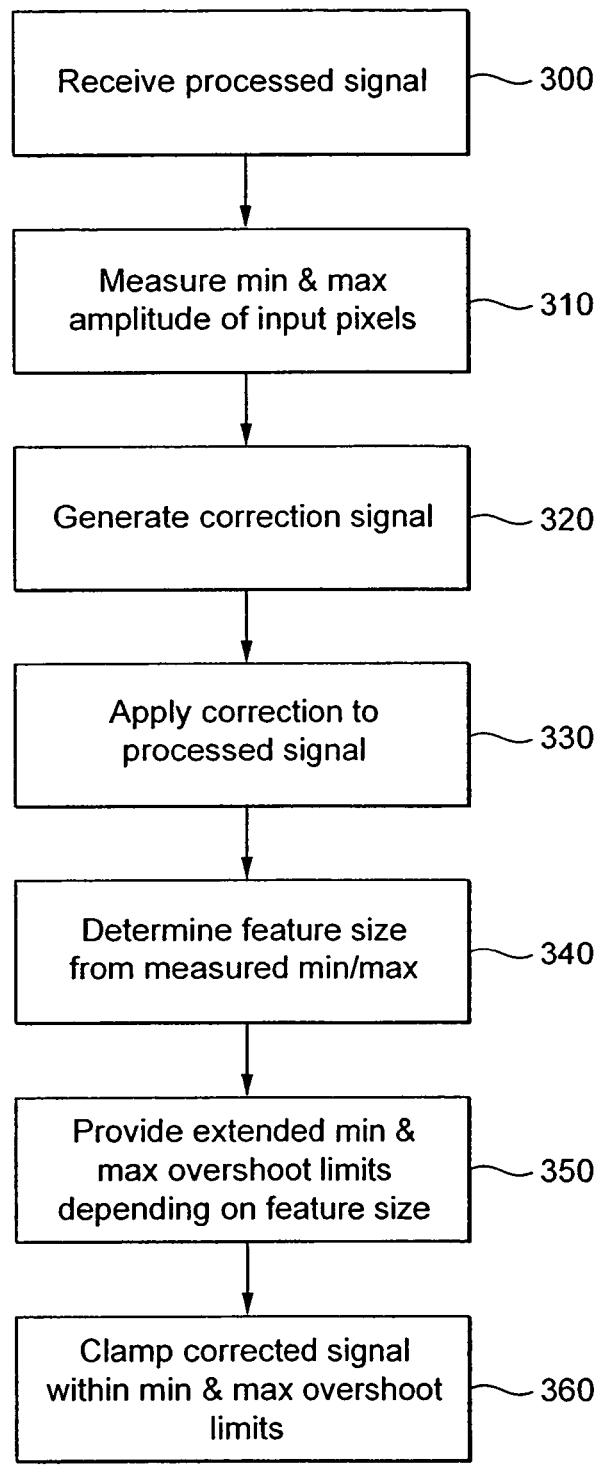
FIG. 3 is a flow diagram identifying the steps taken in a first embodiment of the present invention.

Referring to FIG. 3, at 300 the original processed signal is received. Typically, the processed signal will include edges of the image which have become blurred due to the processing.

As described in the prior art, overshoot clamping begins with local minimum and maximum (minimum and maximum) measurements of the original signal at 310. The measurements are made in a narrow window surrounding the current pixel, as this includes nearby image features in the measurement but excludes more distant ones. Therefore, the maximum and minimum signal values associated with a particular pixel are the measured maximum and minimum values of nearby pixels within a predefined window size. In practice any size of measurement window could be used but, in a typical embodiment, a measurement window of between 3 and 7 pixels width may be selected, with a width of 5 pixels being common. A window width of an odd number of pixels is preferred, for symmetry. Embodiments of the invention which operate in real time include a buffer to store a few scan lines of pixel data. This allows the correction signal calculations and maximum and minimum measurements to take into account pixel data ahead and behind the current pixel. Consequently, the output from the system is delayed by a few line periods.

Figure 4:
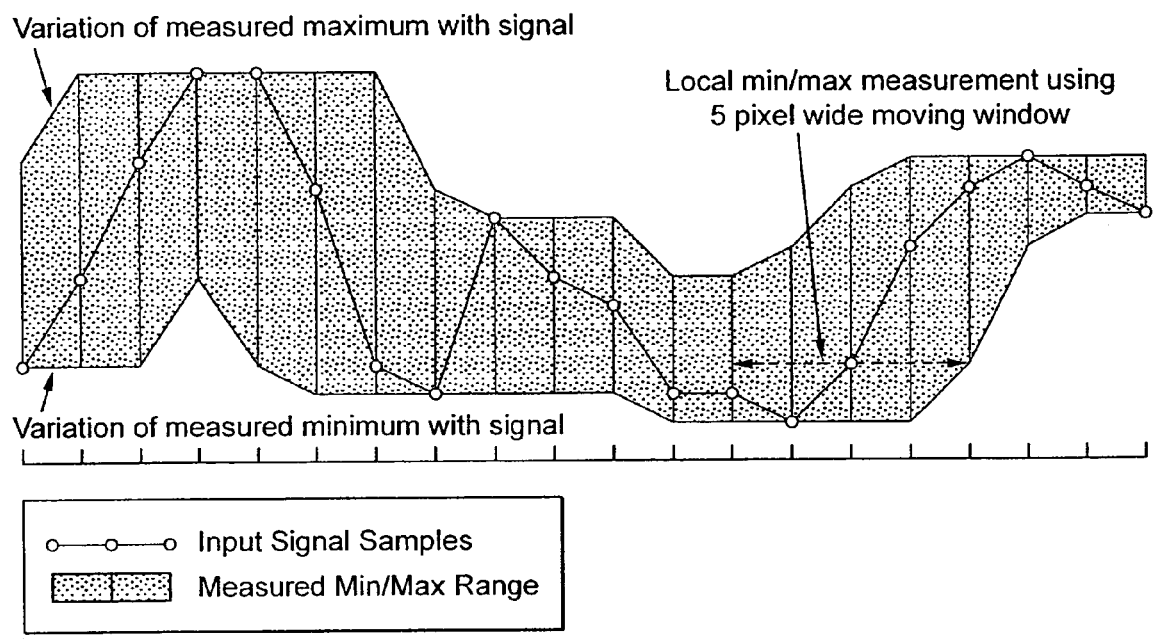
FIG. 4 shows how the measured local maximum and minimum values follow the variations in an input signal.
Figure 5:
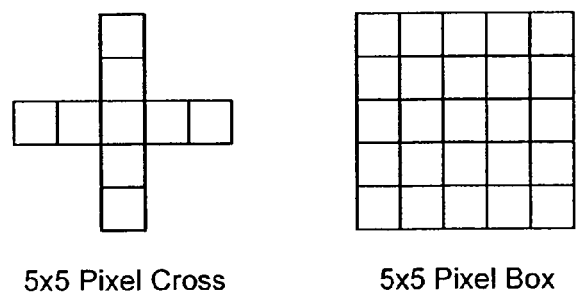
FIG. 5 shows two-dimensional windows for minimum and maximum measurement.

FIG. 4 shows local minimum and maximum values for a typical one-dimensional signal. Real video images are two-dimensional, and where two-dimensional image enhancement has been applied a two-dimensional measurement window is required. A cross shaped window, as shown in FIG. 5 is found to give satisfactory performance, and reduces the number of comparisons significantly compared to a rectangular window. In the remainder of this description a one-dimensional signal will be used for simplicity, however, by the use of a two dimensional minimum and maximum measurement window the method is trivially extended to two dimensions. Clamping based on minimum and maximum measurements from a two dimensional window means that the clamping process must only be performed once per image pixel: Separate horizontal and vertical processes are avoided, and interactions between the two processes are eliminated.

At 320 a correction signal is generated to enhance the blurred images. This may be a second derivative correction signal or any other suitable correction signal. At 330 the correction signal is applied to the original processed signal. Preferred embodiments add the correction signal to the original signal. However, the correction signal could be applied in any suitable way to generate a corrected signal.

The next stage of the enhancement process is to clamp the corrected signal in order to control the effects of overshoot to within an appropriate level.

Figure 6:
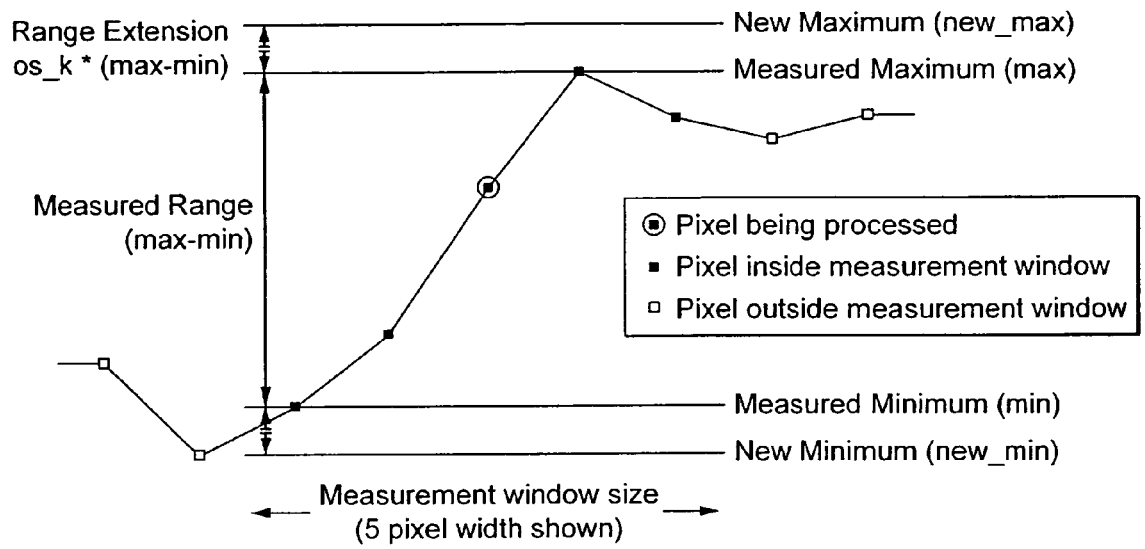
FIG. 6 shows the allowable overshoot range proportional to the feature size.

Having measured the minimum and maximum values of the input signal at 310, embodiments of the invention extend the clamping range (i.e. allow overshoot) by determining the feature size (difference between minimum and maximum of the original signal) at 340. The embodiments then extend the measured range in accordance with the feature size 350. Preferred embodiments provide an overshoot proportional to the size of the feature. However, other levels of overshoot may be used. At 360, the signal is clamped to the extended range (i.e. measured range plus overshoot). FIG. 6 illustrates a signal in which the allowable amount of overshoot is proportional to the feature size.

The basic calculation performed for proportional allowable overshoot is:

new_min=min−((max−min)*$os\_k$)

new_max=max+((max−min)*$os\_k$)

The os_k parameter is a programmable value that controls the level of overshoot that is allowed. Clearly, the max−min term defines the size of the feature.

Once the new clamping limits have been set, the corrected signal is then clamped within these limits. Thus, embodiments using the above calculation permit an amount of overshoot which is proportional to the size of the feature.

Figure 8:
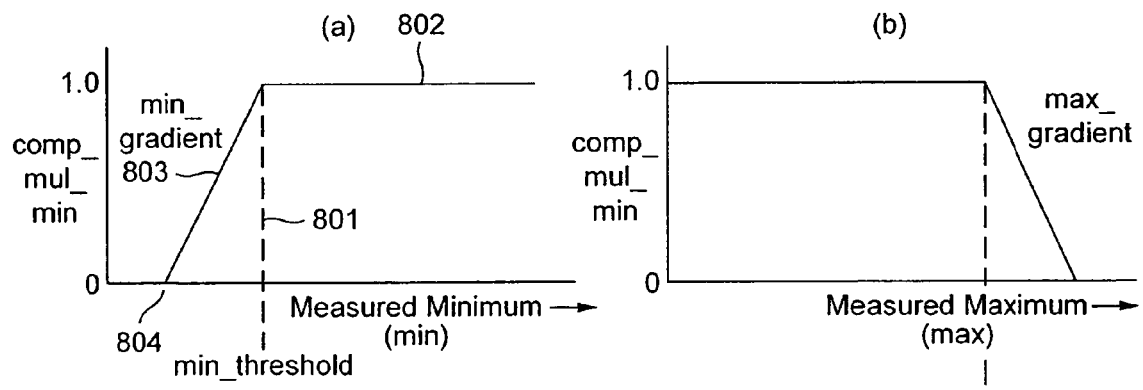
FIG. 8 shows examples of maximum and minimum ramp functions used to compress the allowed overshoot.

Preferred embodiments of the invention incorporate functions such as those shown in FIG. 8 into the overshoot control to generate an additional multiplier to compress the overshoot limit where necessary. Such embodiments calculate permitted overshoot values in dependence on the size of the feature in the same way as the embodiment described with respect to FIG. 3 but, additionally, use a function to compress the amount of the permitted overshoot depending on the position of the feature within the valid signal range.

Typically, as the position of the feature approaches one of the limits of the valid signal range, the appropriate maximum or minimum overshoot value is reduced. For mid range signals the normal amount of overshoot is permitted (i.e. a value proportional to the size of the feature). However, for more extreme signals (e.g. almost white or almost black) which approach the limits of the valid signal range, the amount of permitted overshoot in the direction of the signal range limit is reduced towards zero. This prevents the saturation of the signal as the measured values approach the limits of the signal range.

Figure 7:
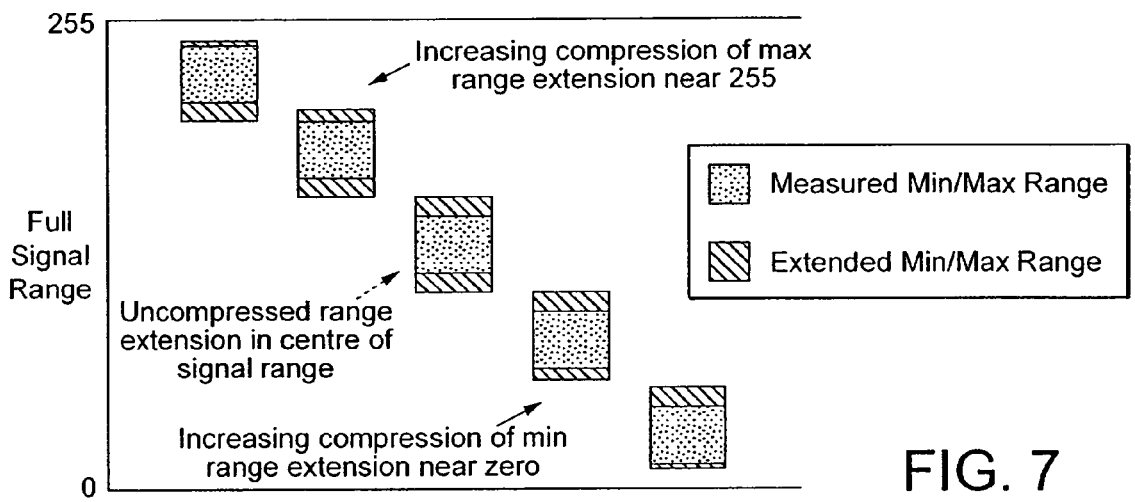
FIG. 7 shows the overshoot compression function.

FIG. 7 shows an example of permitted overshoot values for features at different positions within the valid signal range. The measured size of each of the 5 features is identical. It can be seen that as the measured values approach the limits of the signal range, the size of the allowed overshoot is reduced.

Functions such as those shown in FIG. 8 are used to determine the degree of compression to be applied for signals at different distances from the limits of the signal range. A different function is required for compression at the minimum and maximum limits. A variety of different functions might be considered (e.g. splines or other curves), but it is found that the linear ramp functions illustrated in FIG. 8 give an appropriate degree of control while being straightforward to implement in hardware. Ramp functions can be adapted for individual systems by providing programmable control over threshold and gradient values.

In FIG. 8(a) the ramp function for the minimum limit shows a threshold value 801. For measured minimum values above the threshold, a flat section of the curve 802 indicates that a multiplier of 1.0 is provided to the range extension calculation, and so no compression is applied to the overshoot limit. For measured minimum values below the threshold, the multiplier is reduced linearly according to the gradient 803, reducing the amount of permitted overshoot towards the minimum signal value. Therefore, if the measured minimum value falls below the minimum threshold 801 a multiplier of less than 1 is applied to the overshoot calculation and the extended clamping limit is compressed. At 804 the sloping section of the curve meets the input axis, and for measured minimum values below this point of intercept a multiplier of zero indicates that no overshoot is allowed.

Ramp functions having a lower threshold and steeper gradient will allow a larger range of input values over which no compression is applied and a more abrupt transition into compression, while a higher threshold and less steep gradient will give a more gradual onset of compression.

The ramp function used to calculate the compression multiplier for signals approaching the maximum limit is shown in FIG. 8(b) and is similar to that for the minimum limit but is reversed in order to give increasing compression as the measured maximum value approaches the maximum signal limit.

Figure 9:
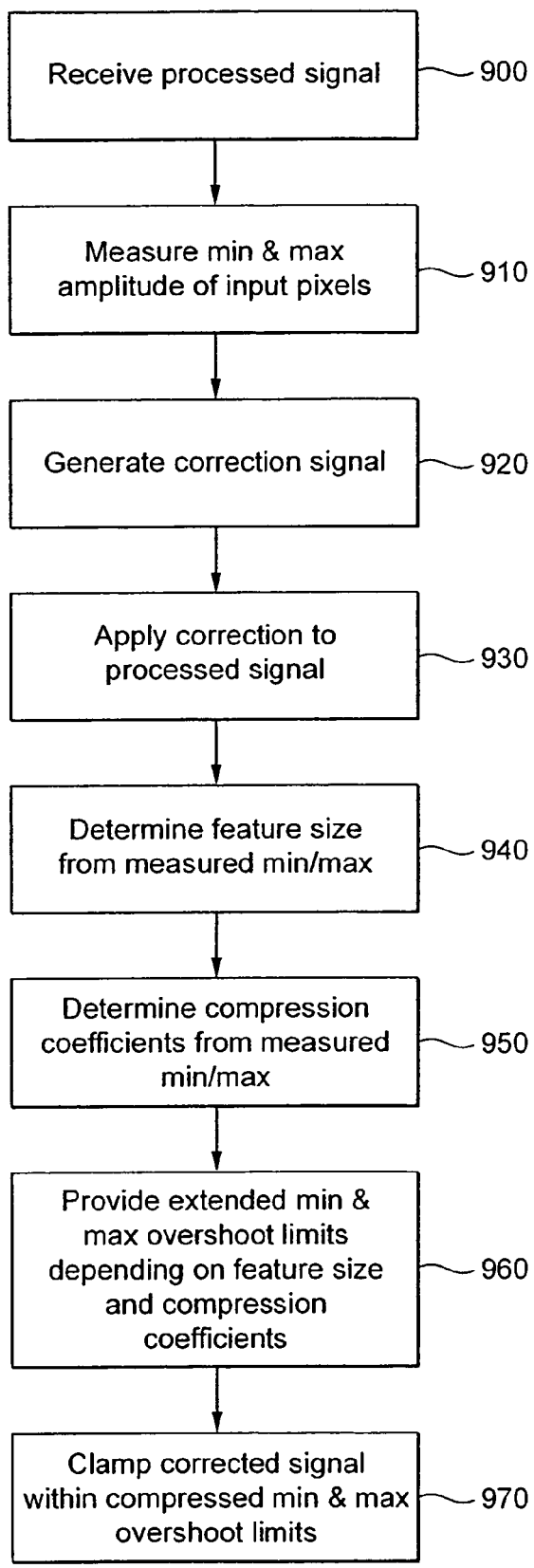
FIG. 9 is a flow diagram showing the steps followed by an embodiment of the invention incorporating overshoot compression.

The steps for implementing embodiments of the invention incorporating overshoot compression are laid out in FIG. 9. Steps 900-940 are equivalent to steps 300-340 of FIG. 3. Additionally, the embodiment of FIG. 9 includes the step 950 of determining compression coefficients from the position of the measured maximum and minimum values with respect to the limits of the signal range. As discussed above, the compression coefficients can be determined using ramp, spline or other suitable functions. The compression coefficients are incorporated into the calculations for the extended minimum and maximum overshoot limits at 960, in order to compress the clamping values in dependence on the position of the feature within the allowable signal range. At 970 the signal is clamped to the compressed maximum and minimum overshoot limits.

The suggested ramp functions can also be described using pseudo-code as follows:

```
For minimum:
    if ( min >= min_threshold )
        comp_mul_min = 1.0;
    else
        comp = (min_threshold - min) * min_gradient;
        if ( comp < 1.0 )
            comp_mul_min = 1.0 - comp;
        else
            comp_mul_min = 0.0;
        endif
    endif
For maximum:
    if ( max <= max_threshold )
        comp_mul_max = 1.0;
    else
        comp = (max - max_threshold) * max_gradient;
        if ( comp < 1.0 )
            comp_mul_max = 1.0 - comp;
        else
            comp_mul_max = 0.0;
        endif
    endif
```

The calculation of new minimum and maximum clamping values is then altered as follows, to incorporate the compression multipliers:

new_min=min−((max−min)*$os\_k$*comp_mul_min)

new_max=max+((max−min)*$os\_k$*comp_mul_max)

With appropriate choice of compression threshold and gradient values, the calculated clamping values will not exceed the valid signal range. If the system is to be used without the compression feature, then it may be necessary to place absolute limits (for example, 0 and 255 in an eight bit system) on the clamping values, or otherwise take precautions to prevent or accommodate overflows and underflows that may occur.

Figure 10:
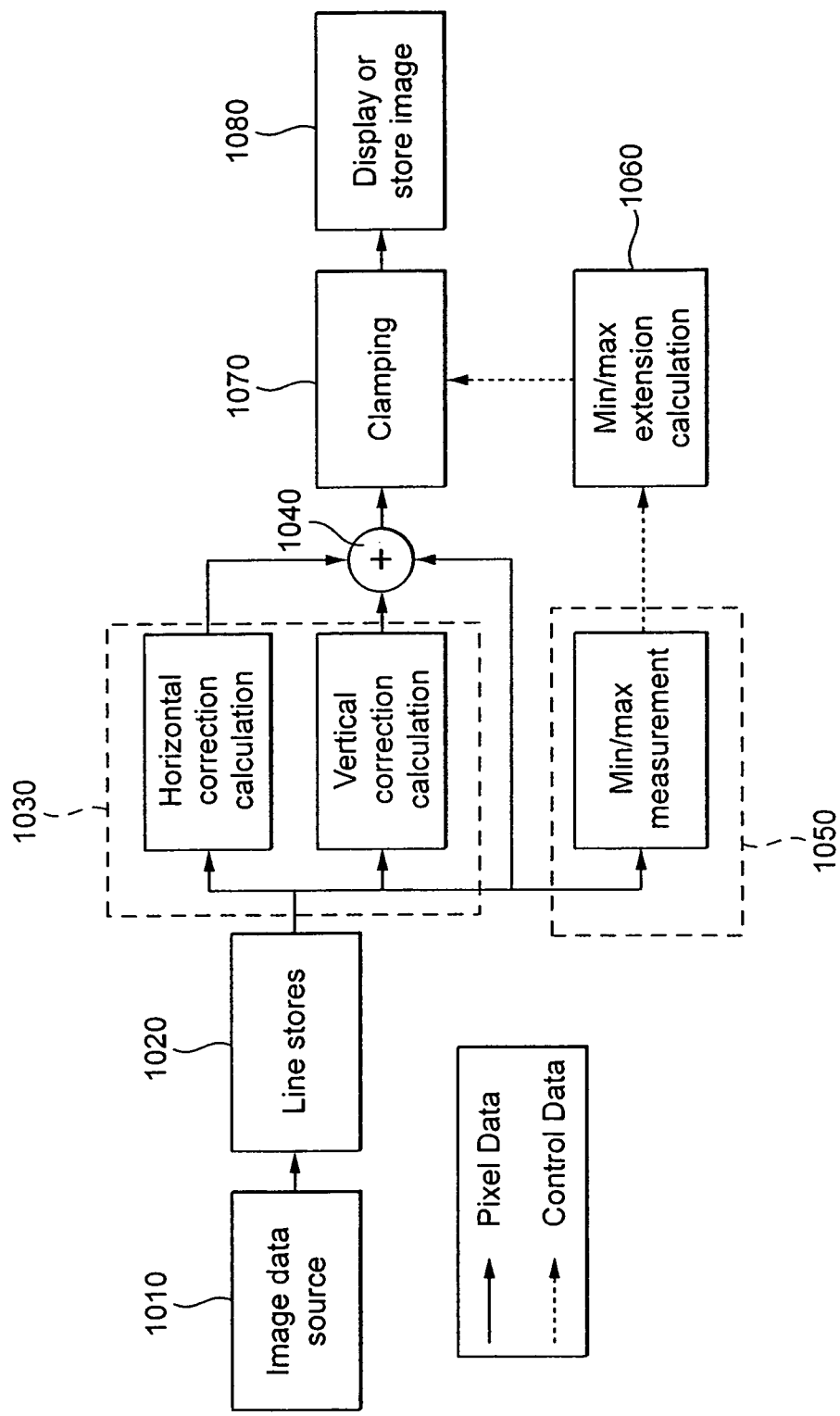
FIG. 10 is a block diagram of an embodiment of the present invention.

FIG. 10 is a block diagram of an embodiment of the present invention. The pixel data is received or created at the image data source 1010. The data is then stored in the line storage means 1020. The line storage means 1020 is particularly relevant to real time systems as discussed above. The pixel data is forwarded to the correction signal generator 1030 which generates a correction signal. The correction signal is applied to the pixel data by the adder 1040 to produce a corrected signal.

Pixel data from the line storage means is also forwarded to the signal analyser 1050 which measures the maximum and minimum levels of the original signal. These maximum and minimum levels are forwarded to the calculator 1060 which calculates the extended clamping limits for the signal. The particular type of function used to calculate the extended clamping limit may be selected by the user.

The corrected signal and extended clamping limits for the signal are forwarded to the clamping means 1070 which clamps the corrected signal within the extended limits. The clamped corrected signal is forwarded to a displaying or storage means 1080.

Figure 11:
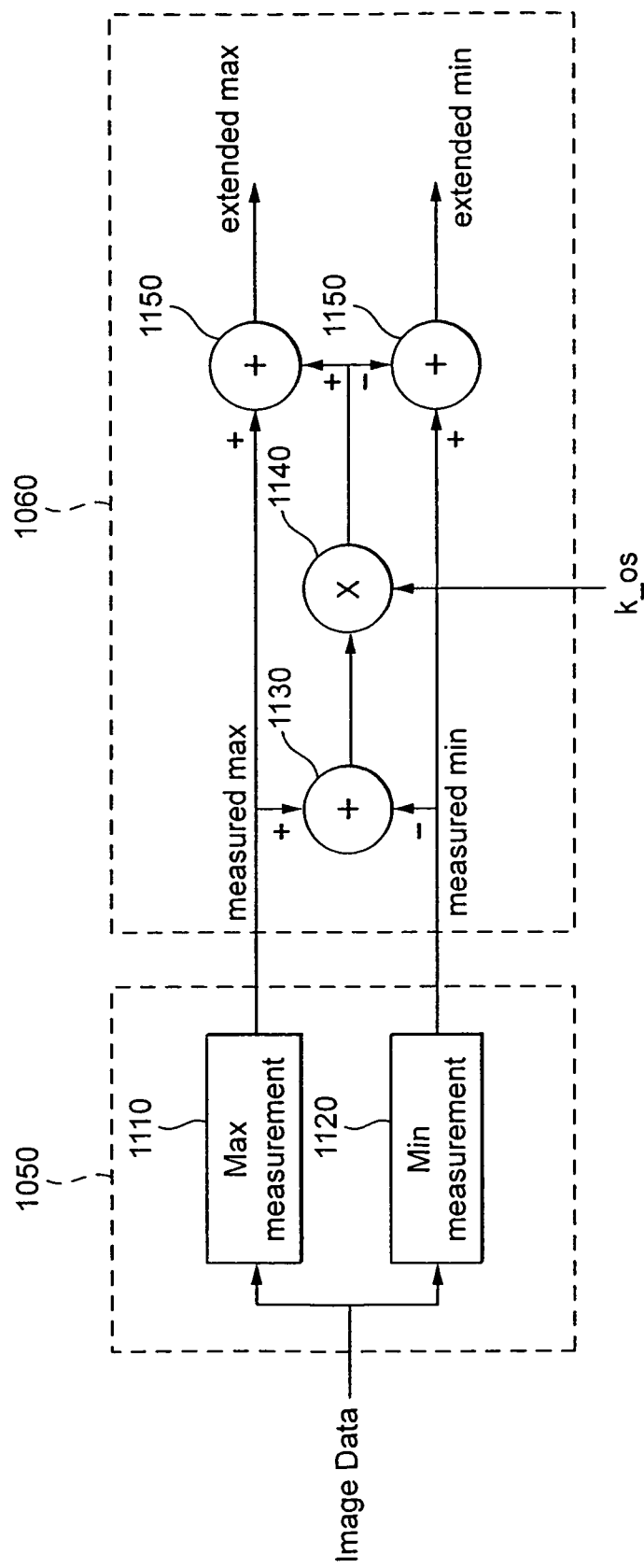
FIG. 11 is a block diagram of an embodiment of the invention which provides proportional overshoot.
Figure 12:
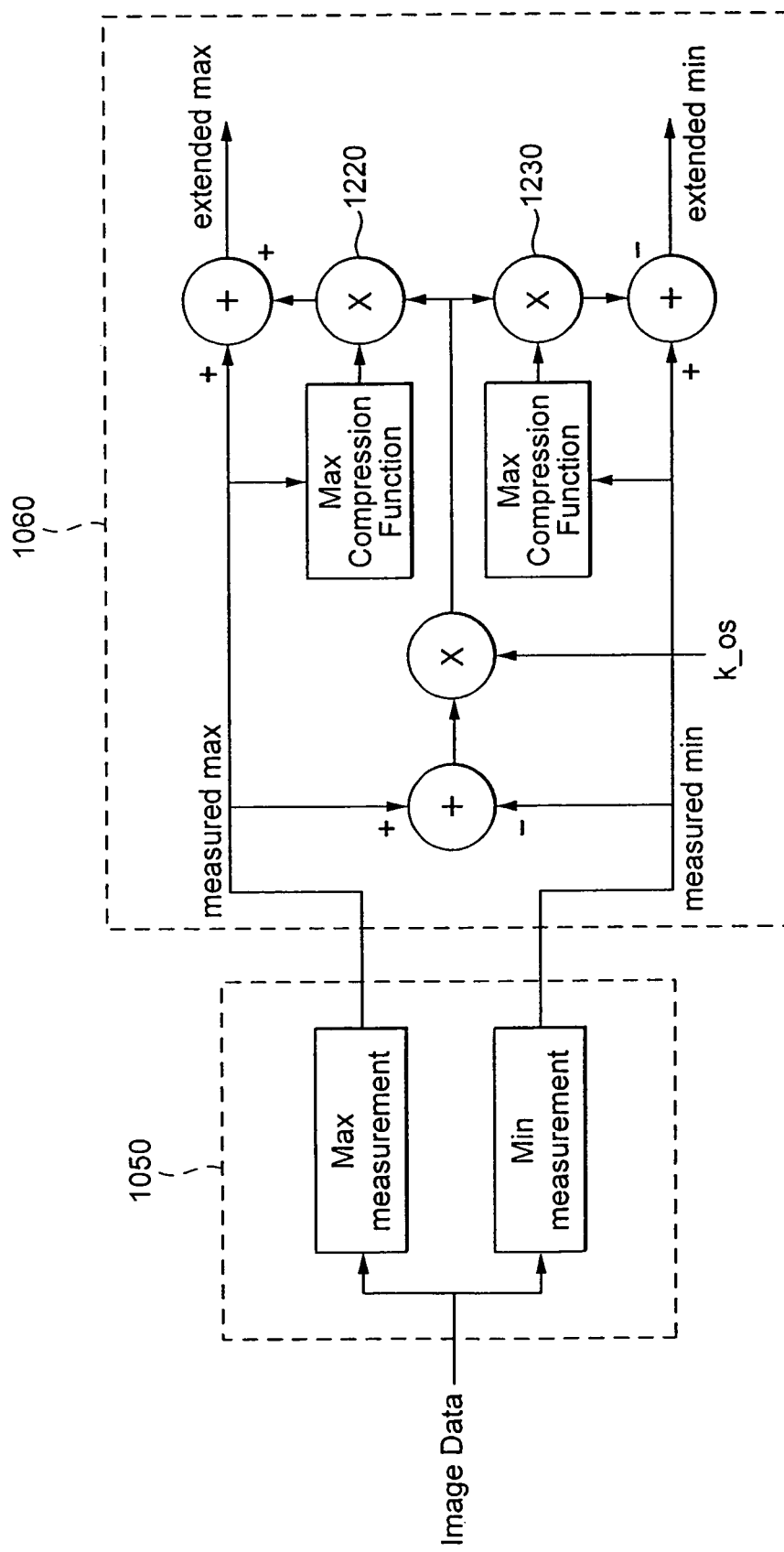
FIG. 12 is a block diagram of an embodiment of the invention which incorporates compression functions.

FIGS. 11 and 12 show the components incorporated within the signal analyser 1050 and calculator 1060. FIG. 11 is an embodiment in which the extended clamping limits are proportional to the size of the signal. The maximum and minimum limits of the original data are measured at 1110 and 1120 respectively by the signal analyser. At 1130 the calculator determines the magnitude of the feature (maximum−minimum). At 1140 the calculator applies the predefined function (k−os) to the feature magnitude to determine the allowed level of overshoot. At 1110 the calculator applies the overshoot to the maximum and minimum measured values of the original signal to generate the maximum and minimum clamping limits.

FIG. 12 shows the components incorporated within the signal analyser 1050 and calculator 1060 in an embodiment which applies a compression function 1210 to the overshoot limits. The compression functions are applied to the overshoot limits at 1220 and 1230 and the compressed overshoot limits are applied to the maximum and minimum measured values of the original signal to generate the maximum and minimum clamping limits.

The examples described above use a black and white signal range however the invention is not limited to such systems. The invention may also be used in any video enhancing system including, for example, systems using chroma or the channels in an RGB image.

It will be clear to those skilled in the art that the present invention provides a means by which overshoot of a signal is permitted in order to enhance the edge of a feature but the amount of overshoot is controlled such that it is proportional to the size of the feature being enhanced. Additionally, the overshoot limit can be compressed in dependence on the position of the feature within the allowed signal range. Thus, embodiments of the invention provide appropriate enhancement of edges without exaggerating texture or noise, or saturating the signal.

What is claimed is:

1. A method for enhancing an edge transition in a video signal comprising the steps of:
   receiving a video signal including an edge transition;
   generating a correction signal for the edge transition;
   applying the correction signal to the video signal to produce a corrected signal;
   measuring maximum and minimum amplitudes of a cross-shaped window pattern of pixels adjacent to the edge transition; and
   restricting the amplitude of the corrected signal to extend between extended maximum and minimum amplitude limits in dependence on the measured maximum and minimum amplitudes of the cross-shaped window pattern of pixels.

2. An apparatus for enhancing an edge transition in a video signal comprising:
   means for receiving a video signal including an edge transition;
   means for generating a correction signal for the edge transition;
   means for applying the correction signal to the video signal to produce a corrected signal;
   means for measuring the maximum and minimum amplitude of pixels in a cross-shaped window pattern adjacent to the edge transition;
   means for calculating extended maximum and minimum amplitude limits in dependence on the measured maximum and minimum amplitudes; and,
   means for restricting the amplitude of the corrected signal within the extended maximum and minimum amplitude limits.

* * * * *